US010303630B2

(12) United States Patent
Lee

(10) Patent No.: US 10,303,630 B2
(45) Date of Patent: May 28, 2019

(54) CONFIGURABLE HARDWARE ACCELERATORS

(71) Applicant: HUAWEI TECHNOLOGIES CO., LTD., Shenzhen (CN)

(72) Inventor: Chang Lee, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/727,630

(22) Filed: Oct. 8, 2017

(65) Prior Publication Data

US 2019/0108152 A1 Apr. 11, 2019

(51) Int. Cl.
*G06F 13/30* (2006.01)
*G06F 9/48* (2006.01)
*G06F 9/50* (2006.01)

(52) U.S. Cl.
CPC ............ *G06F 13/30* (2013.01); *G06F 9/4843* (2013.01); *G06F 9/5038* (2013.01); *G06F 9/505* (2013.01)

(58) Field of Classification Search
CPC ....... G06F 13/30; G06F 9/4843; G06F 9/5038
USPC .......................................................... 710/23
See application file for complete search history.

(56) References Cited

U.S. PATENT DOCUMENTS

| | | | | |
|---|---|---|---|---|
| 4,545,014 A * | 10/1985 | Oguchi | ................ | G06F 13/285 710/22 |
| 5,151,895 A * | 9/1992 | Vacon | ................ | G06F 13/128 370/420 |
| 5,727,233 A * | 3/1998 | Lynch | ................ | G06F 13/385 710/35 |
| 5,778,175 A * | 7/1998 | Paul | ................ | H04L 12/413 709/235 |
| 5,809,334 A * | 9/1998 | Galdun | ................ | G06F 13/28 710/22 |
| 5,958,024 A * | 9/1999 | Typaldos | ................ | G06F 13/385 709/221 |
| 6,161,208 A * | 12/2000 | Dutton | ................ | G06F 11/1008 711/118 |
| 6,385,671 B1 * | 5/2002 | Hunsaker | ................ | G06F 13/28 370/300 |
| 6,418,489 B1 * | 7/2002 | Mason | ................ | G06F 13/28 710/22 |

(Continued)

FOREIGN PATENT DOCUMENTS

| | | |
|---|---|---|
| CN | 102662889 A | 9/2012 |
| CN | 103473188 A | 12/2013 |
| WO | 2015042684 A1 | 4/2015 |

*Primary Examiner* — Paul R. Myers
(74) *Attorney, Agent, or Firm* — BCF LLP

(57) ABSTRACT

In various embodiments, a configurable hardware accelerator is provided. The configurable accelerator may include a transmit direct memory access (DMA) engine, a receive DMA engine, and one or more execution engines. In those embodiments, the configurable accelerator can be configured to access a shared data storage in a continuous mode. The transmit and receive DMA engines can be configured to transmit data from one location in the shared data storage to a different location in the memory storage. The execution engine(s) can be configured to perform a wide range of functions on the data accessed by the transmit DMA engine(s) in streaming fashion. In those embodiments, the data are accessed and processed by the configurable accelerator in a streaming manner to speed up the data processing performance.

20 Claims, 8 Drawing Sheets

(56) References Cited

U.S. PATENT DOCUMENTS

| | | | | |
|---|---|---|---|---|
| 6,425,021 B1* | 7/2002 | Ghodrat | ............... | G06F 13/28 |
| | | | | 710/20 |
| 6,581,112 B1* | 6/2003 | Kallat | ............... | G06F 13/28 |
| | | | | 710/22 |
| 6,631,433 B1* | 10/2003 | Paluzzi | ............... | G06F 13/364 |
| | | | | 710/113 |
| 7,225,278 B1* | 5/2007 | Baxter | ............... | G06F 13/28 |
| | | | | 710/22 |
| 7,561,571 B1* | 7/2009 | Lovett | ............... | H04L 12/66 |
| | | | | 370/392 |
| 9,563,586 B2* | 2/2017 | Herbeck | ............... | G06F 13/28 |
| 2002/0038401 A1* | 3/2002 | Zaidi | ............... | G06F 13/28 |
| | | | | 710/305 |
| 2002/0055979 A1* | 5/2002 | Koch | ............... | G06F 13/28 |
| | | | | 709/212 |
| 2002/0152428 A1* | 10/2002 | James | ............... | G06F 12/1027 |
| | | | | 714/42 |
| 2003/0172224 A1* | 9/2003 | Gulick | ............... | G06F 12/0879 |
| | | | | 711/1 |
| 2003/0177297 A1* | 9/2003 | Hesse | ............... | G06F 13/387 |
| | | | | 710/305 |
| 2004/0015617 A1* | 1/2004 | Sangha | ............... | H04L 29/06 |
| | | | | 710/10 |
| 2005/0177655 A1 | 8/2005 | Hein | | |
| 2005/0226238 A1* | 10/2005 | Hoskote | ............... | H04L 45/745 |
| | | | | 370/389 |
| 2006/0123152 A1* | 6/2006 | Koch | ............... | G06F 13/28 |
| | | | | 710/22 |
| 2007/0113171 A1 | 5/2007 | Behrens et al. | | |

* cited by examiner

CONFIGURABLE HARDWARE ACCELERATORS

TECHNICAL FIELD

The present disclosure relates generally to computation acceleration.

BACKGROUND OF THE INVENTION

In developments of emerging technology, such as new wireless standards or Artificial Intelligence, the amount of data required to be processed is increasing substantially. With the profusion of data, more computational requirements are placed on general purpose CPUs, specialized CPUs (i.e. GPU, TPU) and/or specialized Hardware Accelerators to expeditiously process the data.

As the computational requirement placed on the processors increases, the performance of the processors is often inadequate to handle computationally intensive tasks on large amount of data. In some cases, even if specialized processors are capable of handling the computational requirements, the cost of such processors is often prohibitive for many applications.

There are various factors which limit the computational capabilities of a processor. Traditionally, the processors use internal registers to temporarily hold the source input data which are loaded from the data memory. The processor then performs an arithmetic or other programmed operation using the values stored in the temporary registers as the operands, and writes the result of the operation to another temporary register. Finally, the processor stores the result in the temporary register back to the data memory.

For performing such operations, many instructions are required. For example, ADD Immediate instructions to calculate the operand addresses; LOAD Instructions to load the operands; MULTIPLY instruction to multiply the operands; ADD Immediate instruction to calculate the destination address; and STORE instruction to write the result to the destination memory location.

During the execution of these instructions, due to the inherent load/store latency associated with the data memory and the limited availability of the temporary registers, the instruction executions are often blocked by pipeline stalls resulting in degraded processor performance. The problem of pipeline stall is compounded when the processor operates on large sets of data.

Other common techniques employed in the industry, such as SIMD and Vector Instruction Extensions, try to address the performance issue by parallel data processing. However, these techniques, even though they obtain performance increase through parallelism, are still subject to the aforementioned limitations.

Therefore, it is desirable to have a flexible solution capable of processing large amount of data, which can also be quickly programmed, deployed, and modified as the product matures.

BRIEF SUMMARY OF THE INVENTION

Through various embodiments disclosed herein, a configurable accelerator is described. The configurable accelerator in accordance with the disclosure can provide a flexible solution for processing large amounts of data, thus reducing or eliminating pipeline stalls that may degrade the processor performance. The configurable accelerator in accordance with the disclosure may include a transmit direct memory access (DMA) engine (TXDMA), a receive DMA engine (RXDMA), one or more address generator units (AGU), an execution engine (XE), and/or any other components. In some embodiments, the configurable accelerator can be connected to a shared data storage along with one or more processors or any other entity using the configurable accelerator. In some embodiments, the shared data storage memory may be partitioned into multiple memory banks. In those embodiments, each memory bank can be independently accessed by the configurable accelerator and/or processors connected to the shared data storage memory for read or write operations. The access to the shared data storage memory can be controlled by one or more arbiters associated with each memory bank.

The configurable accelerator in accordance with the disclosure can be programmed using control information to implement different operations. The control information can include the following: one or more TXDMA descriptors, one or more RXDMA descriptors, and one or more XE instructions, which may be collectively referred to as "XE commands". In various embodiments, the XE commands for programming the configurable accelerator can be stored into one or more registers shared by processors and/or the configurable accelerator. In some embodiments, the shared registers can be used to simply store pointers to the XE commands which are stored in the shared data storage memory.

On execution of the XE commands, the configurable accelerator can be directed to initiate, through its TXDMA engine, a DMA transfer request to the RXDMA engine. The DMA transfer request can include RXDMA descriptor information such as a destination address, data transfer length, and/or any other information. The RXDMA engine, upon receiving the DMA transfer request, can generate a request for exclusive write-access to the memory access arbiter associated with the targeted memory bank. Once the exclusive write-access is granted, the RXDMA engine can send the response to the TXDMA engine, indicating that the DMA channel to the targeted bank is open.

After receiving the response from the RXDMA engine, the TXDMA engine can also request and be granted an exclusive read-access to the source bank similar to the RXDMA engine as described above. After the TXDMA engine is granted the exclusive read access, the TXDMA engine can read the source input data from the source memory bank in a streaming manner and in a sequence as set by the XE commands in order for the XE to execute the XE instruction. The source input data stream sequence can be programmed by the XE commands and controlled by the AGUs.

The results of the XE can then be sent to the RXDMA engine. The RXDMA engine can write the results of the XE to the destination memory bank in the sequence as programmed by the RXDMA descriptors. After the entire source input data stream has been processed, the TXDMA engine releases the exclusive read-access to the source memory bank and sends a request to the RXDMA engine to close the DMA channel, thus causing the RXDMA engine to release the exclusive write-access to the destination memory bank.

The use of exclusive read and write accesses to the source and the destination banks as described above allows the configurable accelerator to operate on large sets of streaming data continuously without any pipeline stall. Furthermore, with the configurable accelerator, the AGUs allow XEs to be implemented to handle a wide range of functions including, but not limited to, arithmetic operations involving multiple operands, operations on scalar or vector data, bit manipulation operations, control instructions, etc. Those skilled in the art would also recognize that the configurable accelerate can be programmed to execute a wide range of algorithms by daisy-chaining multiple XE commands. Once programmed, the configurable accelerator can execute the daisy-chained XE commands in the specified sequence. In some embodiments, the configurable accelerator can execute the daisy-chained XE commands in the specified sequence without requiring involvement from the processor until the entire XE command sequence has been executed and the final result of the algorithm is available for the processor.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

DETAILED DESCRIPTION OF THE INVENTION

In various embodiments, a configurable accelerator is provided. The configurable accelerator can include a TXDMA engine, a RXDMA engine, and one or more execution engines (XEs). In some embodiments, the TXDMA engine can include one or more address generators (AGUs). In some embodiments, the RXDMA engine can also include one or more AGUs. In some embodiments, a shared data storage memory can be connected to a processing unit and the configurable accelerator, for providing programming instructions and/or storing results for the configurable accelerator. The shared data storage memory can include multiple memory banks.

Figure 1:
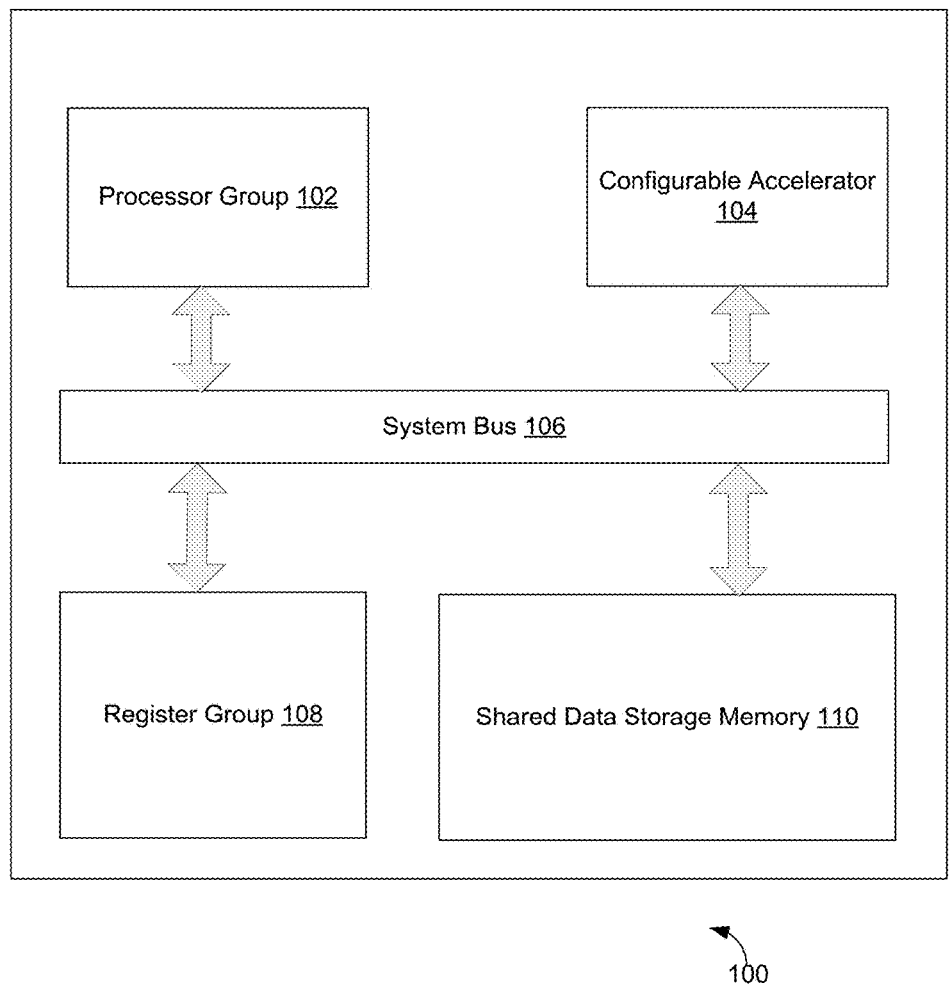
FIG. 1 illustrates an exemplary computation architecture with a configurable accelerator in accordance with the disclosure.

FIG. 1 illustrates an exemplary computation architecture 100 having a configurable accelerator in accordance with the disclosure. As shown, the computation architecture 100 can include a processing unit group 102, a configurable accelerator 104, a system bus 106, a register group 108, shared data storage memory 110, and/or any other components. The processor unit group 102 can include one or more processing units configured to process data stored in the shared data storage memory 110. An individual processing unit in the processing unit group 102 can process data by executing one or more instructions to cause the configurable accelerator to load/store and perform arithmetic functions on the data. The instructions executed by the configurable accelerator 104 can be stored in a register in the register group 108. In certain embodiments, the processing units in the processing unit group 102 can include one or more general purpose processors configured to execute machine-readable instructions. The instructions for the processor group 102 can be stored in an instruction memory (not shown). A person of ordinary skill in the art would understand the processing units included in the processing unit group 102 can include specific purpose processors, micro-controllers, hardware logic, state machine, and/or any other type of processing units.

The configurable accelerator 104 can be configured to perform functions (including arithmetic functions) on the data stored in the memory banks of shared storage memory 110. Different from a traditional hardware accelerator, the configurable accelerator 104 in accordance with the disclosure can perform different functions in a streaming manner on varying number of operands stored in the memory banks of shared storage memory 110. In this sense, the configurable accelerator 104 in accordance with the disclosure is more flexible than a traditional hardware accelerator which may only perform a specific and preset arithmetic function. Some examples of the configurable accelerator 104 in accordance with the disclosure will be illustrated in FIG. 2 and FIG. 3A.

The system bus 106 can be configured to connect the one or more processing units in the processing unit group 102, the configurable accelerator 104, the register(s) in the register group 108, the shared data storage memory 110, and/or any other components in the computation architecture 100. In certain embodiments, the system bus 106 can be used to transmit information (e.g., control instructions, address information, data) between these components. In one embodiment the system bus 106 connects the processing units in the processing unit group 102 and the configurable accelerator 104. In an alternate embodiment (not shown), the processing units in the processing group 102 can be connected directly to the configurable accelerator 104, without using a system bus.

The register group 108 may include one or more registers configured to store instructions. The instructions stored in the register group 108, when executed by the configurable accelerator 104, can cause the accelerator 104 to load/process the data stored in the shared data storage memory 110, and to store data to the shared storage memory 110. The instructions stored in an individual register may include XE commands that can cause the configurable accelerator 104 to initiate an access request to access the shared data storage memory 110, to process data stored in the shared data storage, to store results of the processing to the data storage memory 110, and/or to perform any other operations. In one embodiment, the instructions stored in register group 108 may include an instruction that can cause the configurable accelerator 104 to load data from a first location to a second location within shared storage memory 110. It should be understood that although register group 108 is illustrated in this example as storing the XE commands, this is not intended to be limiting. In some other embodiments, the XE commands can be stored elsewhere, such as the shared data storage memory 110, a dedicated data storage, or any other suitable data storage.

The shared data storage memory 110 can include multiple individual banks configured to store data to be processed by the one or more processing units in the processing unit group 102 and the configurable accelerator 104. Under the computation architecture 100, the configurable accelerator 104 can be programmed to perform a range of functions on varying number of operands in a streaming manner. By allowing a direct memory access (DMA) of the data stored in the shared data storage memory 110, this architecture can speed up performance of the one or more processing units in the processing unit group 102. It should be understood, the phrase "streaming manner" or "continuously" used in the context of the configurable accelerator being able to use a DMA access channel without interruption.

The functions that can be performed by the configurable accelerator 104 can include but not limited to, arithmetic operations involving multiple operands, operations on scalar or vector data, bit manipulation operations, control instructions, etc. Those skilled in the art would also recognize that the configurable accelerator 104 can be programmed to execute a wide range of algorithms by daisy-chaining multiple XE commands. Once programmed, the configurable accelerator 104 can execute the daisy-chained XE commands in the specified sequence without requiring involvement from the one or more processors in the processing group 102 until the entire XE command sequence has been executed.

Figure 2:
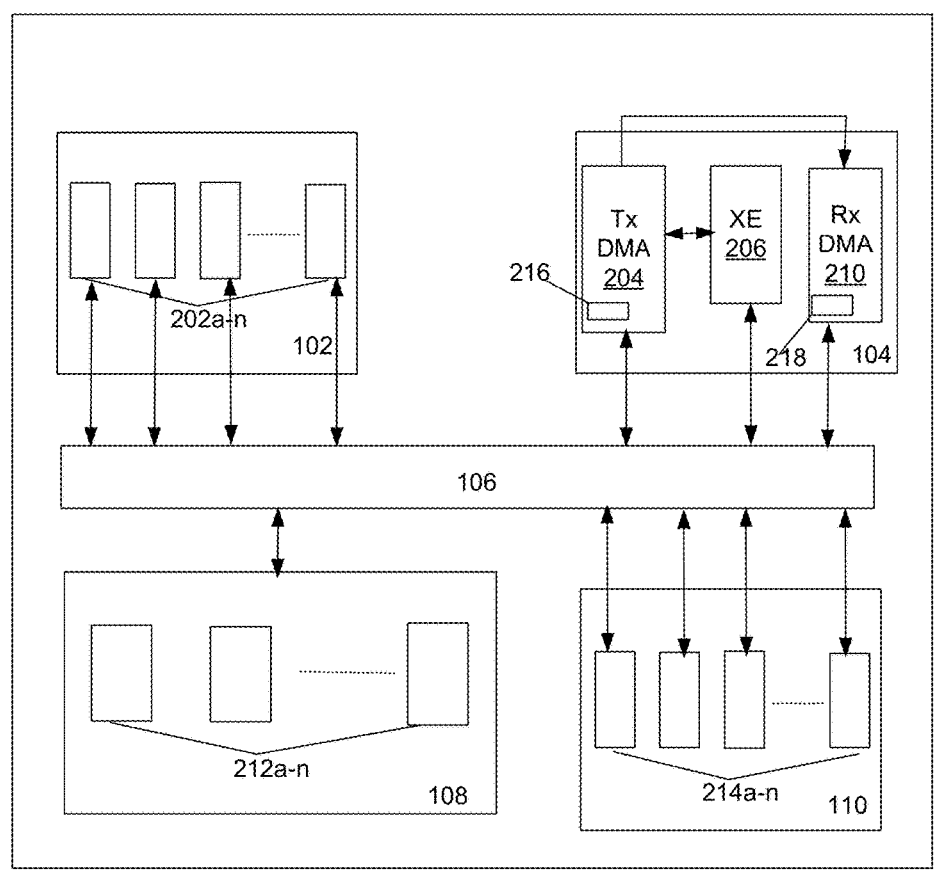
FIG. 2, illustrates an exemplary implementation of the computation architecture shown in FIG. 1.

With the general structure of the computation architecture 100 in accordance with the disclosure having been described and illustrated, attention is now directed to FIG. 2, where more details in an exemplary implementation of the computation architecture 100 are illustrated. As shown in this example, the processor group 102 can include one or more processors 202, such as processors 202*a-n*. The individual processors 202 in the processor group 102 can execute instructions to cause the configurable accelerator 104 to process data. The configurable accelerator 104, as shown in this example, can include a TXDMA engine 204, a RXDMA engine 210, an XE 206 and/or any other components.

The TXDMA engine 204 and RXDMA engine 210 can have a given number of channels to use for the DMA transmission, and a given number of request lines. As used herein, a DMA channel may be referred to as a connection between one memory bank of the shared data storage memory 110 to a different memory bank of the shared data memory 110 through the XE 206, TX DMA engine 204, and RXDMA engine 210. The DMA channel can be used to transfer information directly between two or more memory banks of the shared data storage memory 110. The TXDMA engine 204 in the configurable accelerator 104 can be configured to use one or more channels to connect to the RXDMA engine 210. In various implementations, during the DMA channel request phase, the TXDMA engine 204 can be configured to send a DMA transfer request to the RXDMA engine 210. The DMA transfer request can include RXDMA descriptor information such as a destination address, data transfer length, and/or any other information. After the channel(s) between the TXDMA engine 204 and RXDMA engine 210 is established, data stored in one or more memory banks in shared data storage memory 110 can be processed in a streaming manner—e.g., loaded by the TXDMA engine 204, processed by the XE 206 and the results stored by the RXDMA engine 210. In this way, the configurable accelerator 104 can operate in continuous fashion to perform a wide range of functions.

Figure 3A:
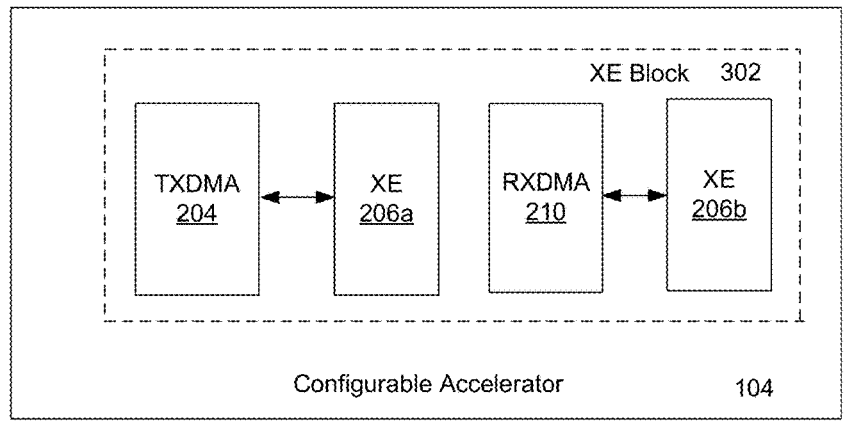
FIG. 3A illustrates one example of a configurable accelerator that can be included in the computation architecture shown in FIG. 1.

It should be understood although one TXDMA engine 204, one RXDMA engine 210 and one XE 206 are illustrated in FIG. 2 as being included in configurable accelerator 104, more than one TXDMA engine 204, more than one RXDMA engine 210, and/or more than one XE 206 can be included in a configurable accelerator 104. For example, FIG. 3A illustrates one example where the configurable accelerator 104 can have two XEs 206, i.e., 206*a* and 206*b*. As shown, the XE 206*b* shown in this example can be connected to the RXDMA engine 210. In this example, the TXDMA engine 204 can be configured to send, through a data connect between the TXDMA engine 204 and RXDMA engine 210, XE instructions to the RXDMA engine 210. The XE 206*b* can process data received by the RXDMA engine 210 continuously. In this way, arithmetic functions with multiple operands can be achieved by the configurable accelerator 104.

Figure 3B:
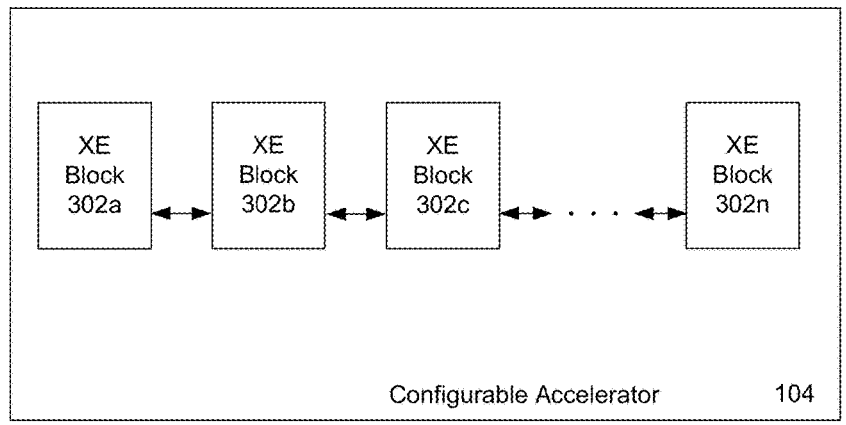
FIG. 3B illustrates another example of a configurable accelerator that can be included in the computation architecture shown in FIG. 1.

In some examples, the TXDMA engine 204, the RXDMA engine 210 and the XE 206*a* and 206*b* shown in FIG. 3A can form an XE block 302. In one embodiment, multiple XE blocks 302 can be daisy chained in the configurable accelerator 104. This is illustrated in FIG. 3B. The number of XE blocks 302 that can be daisy chained in the configurable accelerator 104 may be a design choice. Typically, the more number of XE blocks 302 in the configurable accelerator 104 the more flexibility the configurable accelerator 104 can be achieved. However, on the other hand, increasing number of blocks 302 in the configurable accelerator 104 may increase the cost and the size of the configurable accelerator 104.

Referring back to FIG. 2, the TXDMA engine 204 can be configured to continuously read (load) data from banks in the shared data storage memory 110 after the DMA channels are open. The data read by the TXDMA engine 210 can be sent to the XE 206 for execution. In this way, the XE 206 can operate on a continuous data stream so that pipeline stalls can be reduced or in some cases even eliminated. In some embodiments, the TXDMA engine 204 can include one or more an address generators (AGU) 216 that can be configured to ensure proper address generation to read the required operands (data) for execution by the XE 206. In this way, operands (data) are continuously sent to the XE 206 and the results obtained by the XE 206 can be streamed to the RXDMA engine 210 for storage in the memory banks in the shared data storage memory 110. In some implementations, the result of the last XE can be temporarily stored in a buffer (not shown) and can be used as an operand for the next data set if necessary.

In some examples, the RXDMA engine 210 can be connected with an XE 206*a* (such as the one shown in FIG. 3A). In those examples, the RXDMA engine 210 can be configured to further process the received data with the XE (such as 206*b*) before writing the data to the memory bank location in the shared data storage memory 110. In those examples, the XE 206*b* connected to the RXDMA engine 210 can be configured to use the received data as its operands, and can be configured to perform further calculations in the performed arithmetic function. In various implementations, the RXDMA engine 210 can include an address generator, such as the AGU 218 shown to write the received data to multiple destination addresses in the memory bank as required.

In various implementations, the AGU 216 and AGU 218 can be used to determine the next storage memory location from which data can be fetched by the TXDMA engine 204 or stored by the RXDMA engine 210, respectively. In those implementations, the AGU 216 and AGU 218 can take the one or more of the following input parameters: start address, end address, address step, address offset, address mode, and/or any other parameters. In some examples, to support various functions required in signal processing applications, the AGU 216 and AGU 218 can operate in two different modes: a normal model and a block model.

In the normal mode, the output of the AGU 216 and AGU 218 can start at the start address location, and increments by address step every clock cycle until it reaches the end address. In this example, an address is referred to a memory address, and more particularly, to the memory address in the shared data storage memory 110. In some applications, it is useful to have an AGU that can generate outputs in "interleaved-fashion" (i.e 0, 512, 1, 513, 2, 514, . . . 511, 1023). This can allow the XE 206 to fetch the required operands from multiple address locations.

In the block mode, as in normal node, the AGU 216 and AGU 218 can add address step value to the current address to calculate the next address, which is set to 512 for the sequence of 0, 512, 1, 513, 2, 514 . . . 511 1023. However, in the block mode, when the "current address+address step" yields value greater than the end address (1024 in this example), the next address can be "wrapped" as shown by the pseudo code below:

If(current_address+Address Step)>=End Address)
{next_address=((current_address+Address Step)
mod End Address)+Address Offset}

Therefore, by way of example, the addresses generated by the AGU described above can be the following:

3rd Address:((512+512)mod 1024)+1=1

4th Address:((1+512)mod 1024)+1=513

5th Address:((513+512)mod 1024)+1=2

. . . until current_address+Address Offset<=End Address

Figure 8:
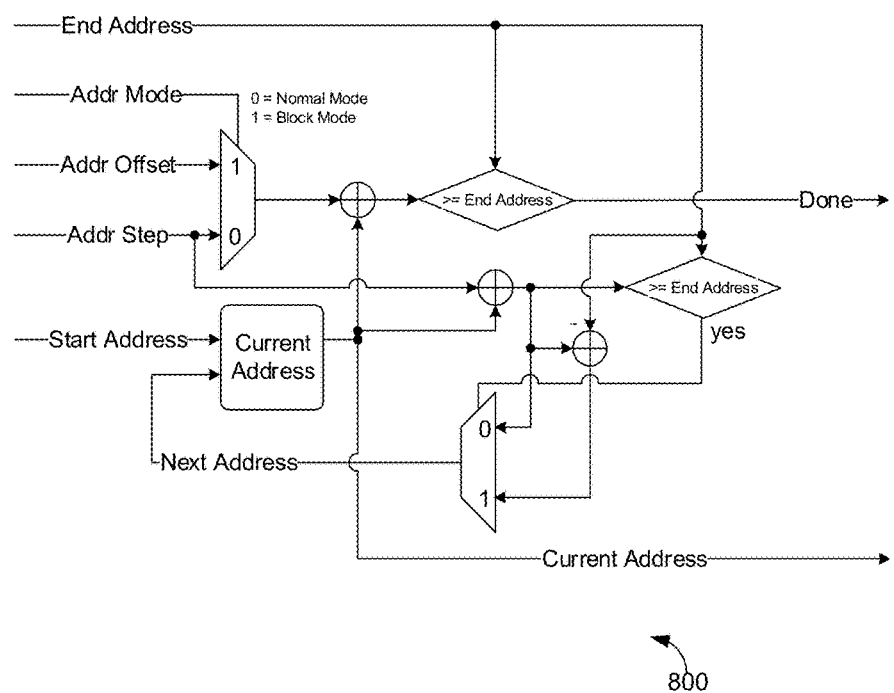
FIG. 8 illustrates an example implementation for implementing the address generators shown in FIG. 2.

In summary, by utilizing the two operational modes, the AGU 216 and/or 218 can generate various sequences of addresses required for fetching the XE 206 operands. Having a mixture of AGUs such as 216 and 218 in the configurable accelerator 104 can add flexibility in generating required addresses for the XE 206 operands. An example implementation 800 for address generator 216 and/or 218 is illustrated in FIG. 8. The number of AGUs that can be included in a TXDMA or RXDMA engine is a design choice and is thus not limited. In general, if an XE is to achieve multiple functions with one of them having a most number of operands, then it may be desired to have this number of AGUs in the TXDMA engine and/or RXDMA engine.

Referring back to FIG. 2, the register group 108 may include one or more registers, such as registers 212*a-n* as shown in this example. The individual registers in the register group 108 can include a register that can be used by a processing unit 202 in the processing unit group 102 to store an XE command to cause the TXDMA engine 204 in the configurable accelerator 104 to transmit data from one or more locations in the shared data storage memory 110 to another location or other locations in the shared data storage memory 110, for example, from one memory block to another. The individual register can be used by a given processor in the processing group 102 to store an XE command to cause the XE 206 in the configurable accelerator 104 to execute the XE command. The configurable accelerator 104 may be configured to read the XE commands from the register in the register group 108 and execute the XE commands accordingly. In some embodiments, the shared registers can be used to simply store pointers to the XE commands, while the XE commands are stored in the shared data storage memory 110.

The shared data storage memory 110 may include multiple memory banks, such as the memory banks 214*a-n* as shown in this example. As described, the banks in the shared data storage memory 110 can store data that to be processed by configurable accelerator 104. The TXDMA 204 and the RXDMA 210 engines may be configured such that destination location may be in a different bank than the source location. In one embodiment, when data is loaded by the configurable accelerator 104 from a first memory bank in the shared data storage memory 110 and processed by the XE 206 in configurable accelerator 104 to obtain a result, the result may be stored in a second memory bank that is different from the first memory bank.

As described herein, the configurable accelerator 104 can be programmed by XE commands to implement different operations. A given XE command can include the following: one or more TXDMA descriptors, one or more RXDMA descriptors, and one or more XE instructions. On execution of the XE commands, the configurable accelerator 104 can be directed to initiate, through its TXDMA engine 204, a DMA transfer request to the RXDMA engine 210. The DMA transfer request can include RXDMA descriptor information such as a destination memory address, data transfer length, or any other information. The RXDMA engine 210, upon receiving the DMA transfer request, can generate a request for "exclusive write-access" to the arbiter associated with the targeted memory bank. Once the exclusive write-access is granted, the RXDMA engine 210 can send the response to the TXDMA engine 204, indicating that the "DMA channel" to the targeted memory bank is "open".

After receiving the response from the RXDMA engine 210, the TXDMA engine 204 can also request and be granted a "exclusive read-access" to the source memory bank similar to the RXDMA engine 210 as described above. After the TXDMA engine 204 is granted the exclusive read access, the TXDMA engine 204 can read the source input data from the source memory bank in a continuous streaming manner in a sequence as set by the XE commands in order for the XE 206 to execute the XE instruction. The source input data stream sequence can be programmed by the XE commands and controlled by the AGUs.

The results of the XE can then be sent to the RXDMA engine 210. The RXDMA engine 210 can write the results of the XE 206 to the destination memory bank in the sequence as programmed by the RXDMA descriptors. After the entire source input data stream has been processed, the TXDMA engine 204 releases the exclusive read-access to the source memory bank and sends a request to the RXDMA engine 210 to "close" the DMA channel, thus causing the RXDMA engine 210 to release the exclusive write-access to the destination bank.

Figure 4:
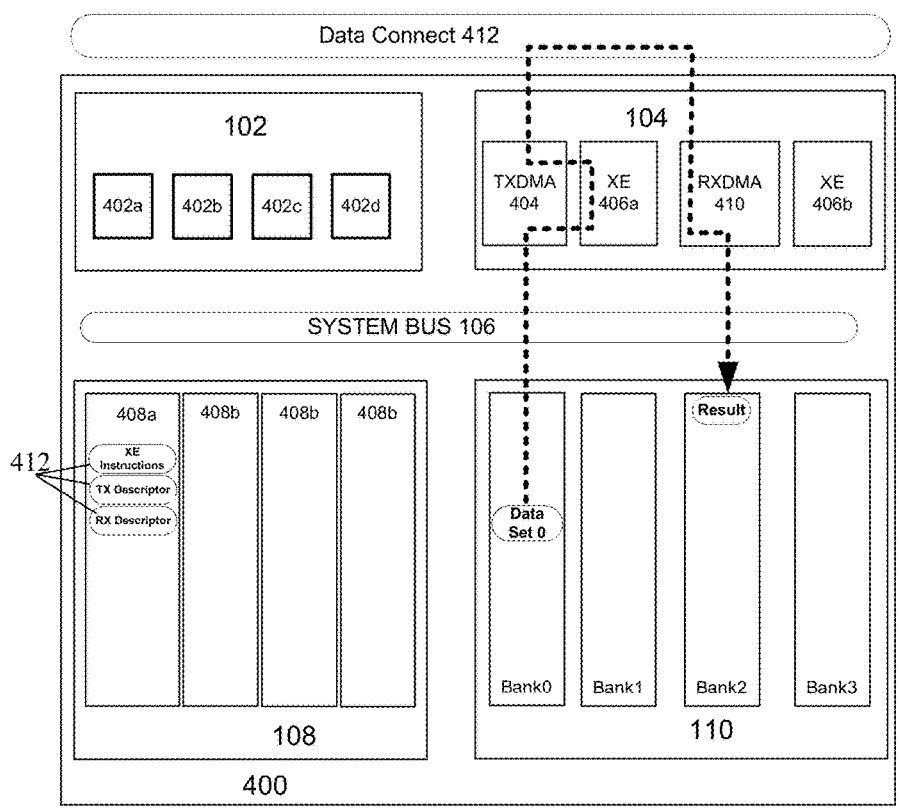
FIG. 4 illustrates one example where the configurable accelerator shown in FIG. 1 can be programmed to perform a single operand function.

FIG. 4 illustrates one example where the configurable accelerator 104 is programmed to perform a single operand function. In the embodiment of FIG. 4, the processing unit group 102 includes four processors, 402a-d. As shown, XE commands 412 for programming the configurable accelerator 104 can be stored in the register group 408a, 408b, 408c, and/or 408d.

An individual XE command 412 can include one or more TXDMA descriptors, one or more RXDMA descriptors, and one or more XE instructions. A given TXDMA descriptor can include information such as a source memory address in the shared data storage memory 110 for loading data, data length, and/or any other information. A given RXDMA descriptor can include information such as a destination memory address in the shared data storage memory 110 for storing results of the configurable accelerator 104, data transfer length, and/or any other information. A given XE instruction can include information instructing the XE 406 to implement a specific arithmetic function, such as information instructing XE how to process data (operands) read by the TXDMA engine 404.

In this example, the configurable accelerator 104 includes a TXDMA engine 404 connected to a corresponding XE 406a. The TXDMA engine 404 can load the data continuously (operand) according to the TX descriptor and sends the data to the XE 406a for performing the designated operand function on the data in order to generate a result. The XE 406a can perform the single operand function according to the XE instruction on the data read by the TXDMA engine 404.

The single operand function that can be performed by configurable accelerator 104 is not limited and can include any suitable function such as shift, etc. In this example, the single operand to be processed by the configurable accelerator 104 according to the XE instruction is dataset 0 stored in memory bank 0 in the shared data storage memory 110. As described above, the reading of dataset 0 by the TXDMA engine 404 can be continuous after the DMA channels are open. The XE 406a can then perform the single operand function on the dataset 0 according to the XE instruction, which can also read by the configurable accelerator 104 through the system bus 106.

In this example, the embodiment comprises a data connect 412 between the TXDMA engine 404 and RXDMA engine 410. Data connect 412 can be any data carrier, connection or channel between the two. As shown, the result obtained by the XE 406a can be transmitted back to the TXDMA engine 404 from XE 406a, and then sent to the RXDMA engine 410 through the data connect 412. As shown, the RXDMA engine 410 can store the result in a memory bank different than the memory bank where the operand (data) is stored. In this example, dataset 0 is stored in memory bank 0 and the result is stored in memory bank 2.

In a further embodiment (not shown), the processors in the processor group 102 can be part of a processor subsystem that are inter-connected through one or more network-on-chip routers with other processor group 102 in a different chip. In those implementations, XE 406a can be configured to process data read by TXDMA engine 404 and the processed data can be transmitted to another processor sub-system. Similarly, on the receiving end, the receiving processor sub-system can perform an arithmetic function on the received data stream via XE 406b and RXDMA engine 410.

Figure 5:
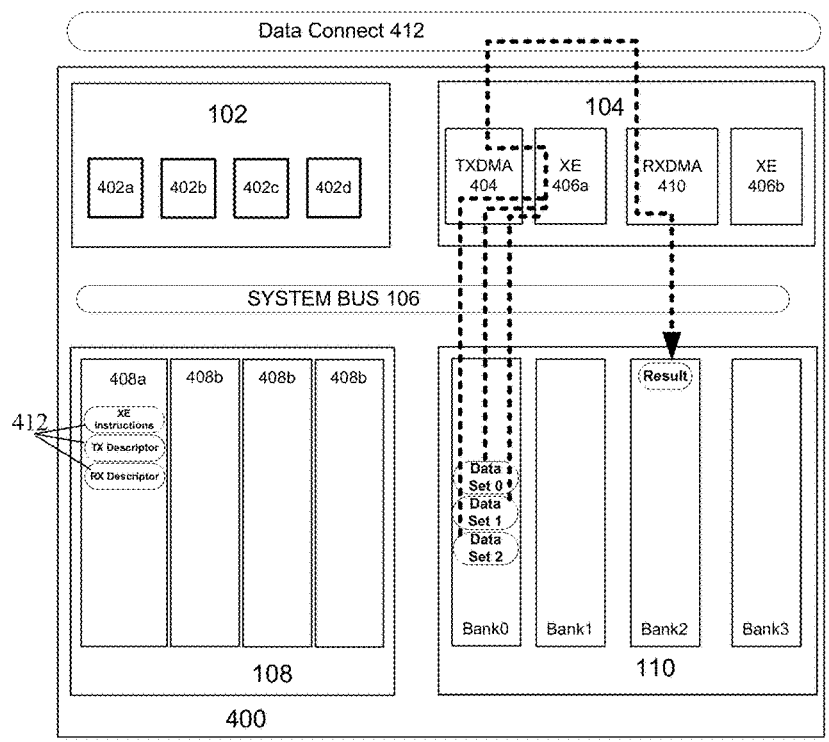
FIG. 5 illustrates one example where the configurable accelerator shown in FIG. 1 can be programmed to perform a multi-operand function.

In some examples, the configurable accelerator 104 in accordance with the disclosure can be configured to perform a function involving multiple operands, such as add, subtract, multiply or the like. FIG. 5 illustrates one example where different operands that can be processed by the configurable accelerator 104 in accordance with the disclosure. In this example, the operands are stored in the same memory bank in the shared data storage memory 110. As shown in this example, for achieving such a function, the TX descriptor can cause the TXDMA engine 404 to load dataset 0 and dataset 1 into XE 406a and perform the first part of multi-operand function. For example, the arithmetic function to be achieved by the configurable accelerator 104 according to the XE instruction is (dataset 0+dataset 1)×dataset 2, dataset 0 and dataset 1 can be first loaded out of bank 0 by the TXDMA engine 404 and sent to the XE 406a for the addition function.

The result of the addition, i.e., dataset 0+dataset 1, can then be transmitted from the XE 406a to the RXDMA engine 410 through the TXDMA engine 404 and the data connect 412. The TXDMA engine 404 can also load the dataset 2 out of the memory bank 0 and send it to the RXDMA engine 410 through the data connect 412. After receiving the addition result and dataset 1 from the TXDMA engine 404, the RXDMA engine 410 can be configured to process the addition result and dataset 2 using the XE 406b that is connected to the RXDMA engine 410. That is the XE 406b can be configured, according to the XE instruction, to multiply the addition result and the dataset 2. The result of the XE 406b can then be stored, by the RXDMA engine 410 into memory bank 2.

Figure 6:
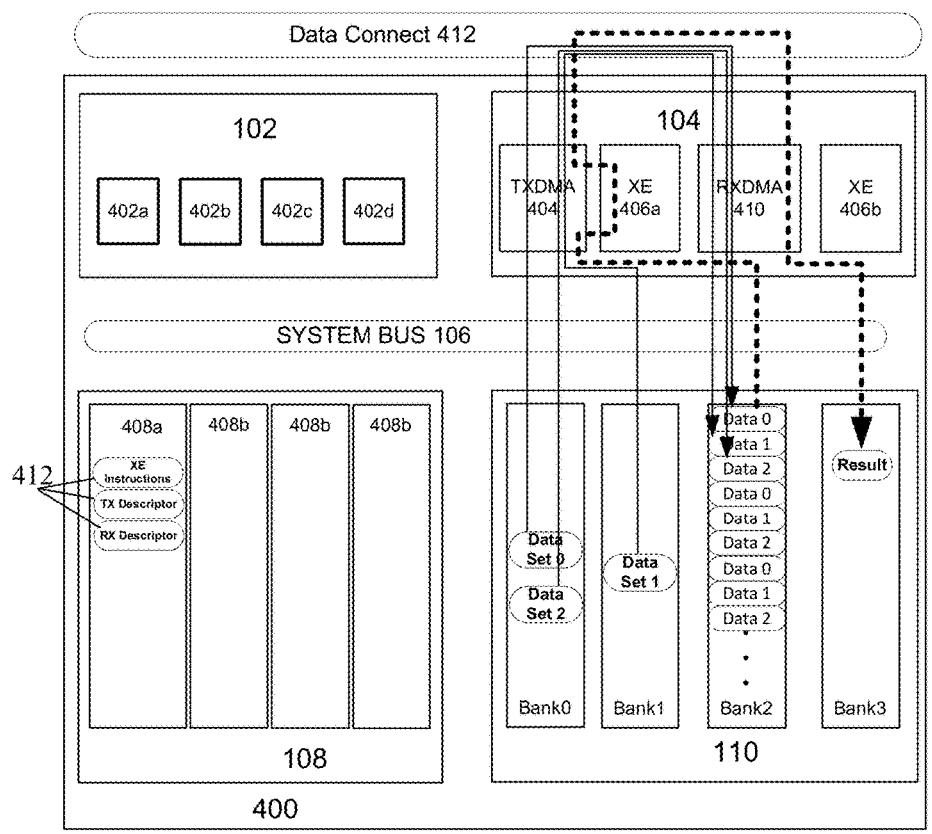
FIG. 6 illustrates another example where the configurable accelerator shown in FIG. 1 can be programmed to perform a multi-operand function.

In some examples, the operands involved in a multi-operand function may not reside in the same bank in the shared data storage 110. In those examples, one or more TXDMA descriptors, as well as one or more RXDMA descriptors can be used to load and store all of the operands into a single memory bank and then have the XE 410 perform the multi-operand arithmetic function on the data in a continuous fashion using DMA to the memory bank. This is illustrated in FIG. 6. As shown in FIG. 6, data or operands for the multi-operand arithmetic function is located in memory banks 0 and memory bank 2. In this example, as shown, after reading the TX descriptor, the TXDMA engine 404 can be configured to load the datasets 0, 1, and 2 out of their respective memory banks, and send them to the RXDMA engine 410 through the data connect 412 for storing in a single memory bank, namely memory bank 2. As still shown, the RXDMA engine 410 can be configured to store the datasets 0, 1 and 2 into the memory bank 2 in an interleaving fashion. The interleaved data stored in memory bank 2 can then be loaded out of memory bank 2 by the TXDMA engine 404 and sent to XE 406a for executing the multi-operand function. The result of this execution can then be sent to the RXDMA engine 410 via the TXDMA engine 404 through the data connect 412. The result can then be stored by the RXDMA engine 210 into a memory bank other than memory bank 2, in this example, illustrated as storing the result in memory bank 3.

The examples of various embodiments provided herein is not intended to be limiting. Those skilled in the art would recognize that an function that can be implemented by XE 406 according to an XE command can include any customized functions operating more than two operands. In general, the output y(i) of the function $f$ implemented by XE, having m operands from datasets $D_{0 \ to \ m-1}$, can be described as:

$$y(i)=f(D_0(i),D_1(i),\ldots,D_{m-1}(i))$$

for i=0 to N−1, where N=number of elements in a dataset

Figure 7:
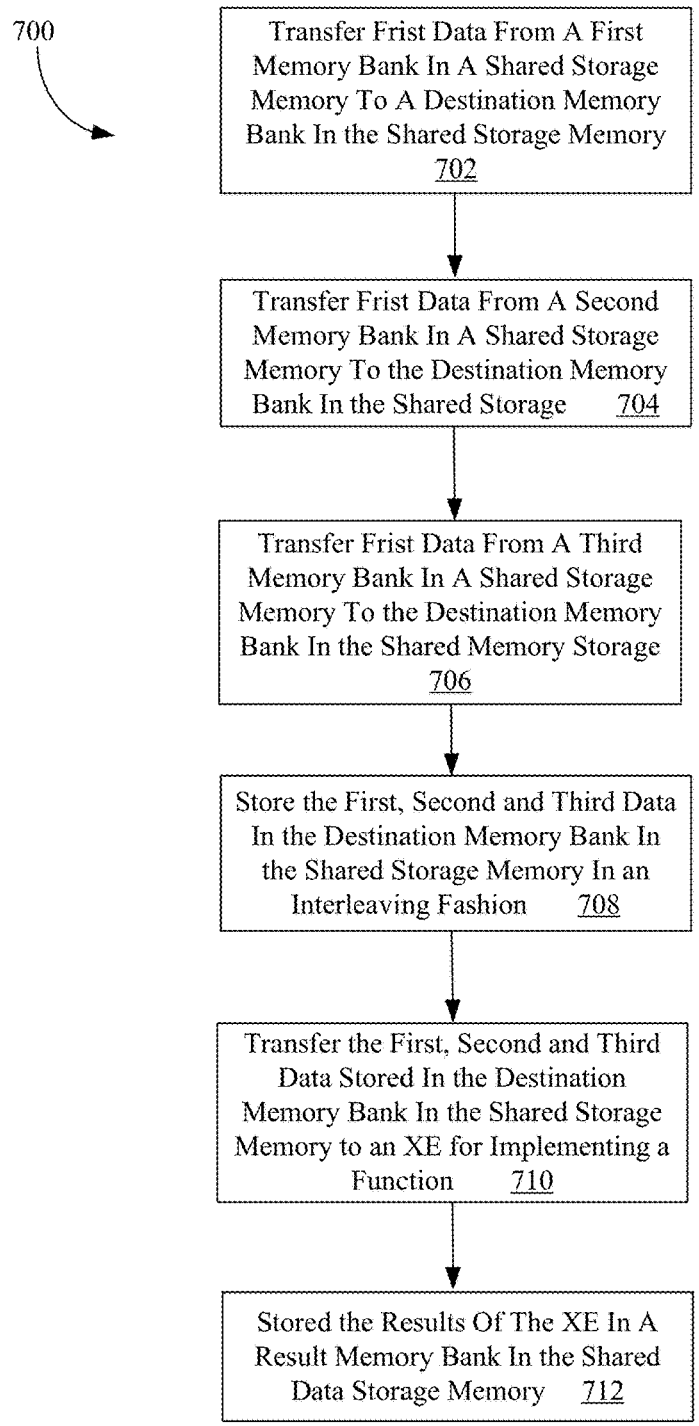
FIG. 7 illustrates an exemplary method for executing a multi-operand function using the configurable accelerator shown in FIG. 1

FIG. 7 illustrates an exemplary method 700 for executing a multi-operand function using the configurable accelerator shown in FIG. 1. It will be evident to those of ordinary skilled in the art that variations of this method can be performed without departing from the teachings of the present disclosure.

At step 702, first data can be transmitted from a first memory bank in a shared data storage memory to a destination memory bank, the destination memory bank being different than the first memory bank. In various implementations, operations invovled in step 702 can be executed by circuitry similar to the TXDMA engine 204 and RXDMA engine 210 illustrated and described herein.

At step 704, a second data can be transmitted from a second memory bank in a shared data storage memory to the destination. The operations invovled in step 704 can be executed in a similar way to step 702.

At step 706, a third data can be transmitted from a memory bank in a shared data storage memory to the destination memory bank. The operations invovled in step 706 can be executed in a similar way to step 702.

At 708, the first, second and third data can be stored in the destination bank in an interleaving fashion. An example of interleavingly storing data is illustrated in FIG. 6. It should be understood by a person of ordinary skill in the art that the data could be stored in any fashion that would be dictated by the order required by the function to be performed by the XE.

At step 710, the interleaved first, second and third data can be transmitted from the destination bank to an XE as operands in a function to be performed by the XE. The XE involved in 710 may the same as or substantially similar to the XE 206a illustrated and described herein. In various implementations, operations involved in 710 can be executed by a TX DMA engine the same as or substantially similar to the TXDMA engine 204 illustrated and described herein.

At step 712, a result of the function performed by the XE on the interleaved first, second and third data can be transmitted to a result memory bank in the shared data storage memory. Operations involved in step 712 can be executed by a RXDMA engine the same as or substantially similar to the RXDMA engine 210 illustrated and described herein.

Those of skill would further appreciate that the various illustrative logical blocks, configurations, modules, circuits, and algorithm steps described in connection with the embodiments disclosed herein may be implemented as electronic hardware, computer software, or combinations of both. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A configurable accelerator for implementing one or more functions, the configurable accelerator comprising:
    at least one transmit direct memory access (DMA) engine configured to continuously load data from a shared data storage memory based on a transmit instruction stored in a register operatively coupled to the configurable accelerator, the transmit instruction configured to cause the configurable accelerator to initiate an access request to access the shared data storage memory;
    at least one execution engine operatively coupled to the transmit DMA engine, the execution engine configured to receive an execution instruction and to implement one or more functions, the execution engine being configured to continuously process the data loaded by the transmit DMA engine based on an execution instruction to generate resultant data; and
    at least one receive DMA engine operatively coupled to the transmit DMA engine and to the execution engine, the receive DMA engine configured to receive the resultant data provided by the execution engine and to continuously store the resultant data to the shared data storage memory.

2. The configurable accelerator of claim 1, wherein the shared data storage comprises multiple memory banks including a first memory bank and a second memory bank, the first memory bank being separate and distinct from the second memory bank; and, wherein
    the data continuously loaded by the transmit DMA engine is located in the first memory bank; and
    the resultant data is stored by the receive DMA engine to the second memory bank.

3. The configurable accelerator of claim 1, wherein the data includes a first operand and a second operand of an arithmetic function implemented by the execution engine, the first operand and second operand being located in a first memory bank of the shared data storage, wherein
    the transmit DMA engine is configured to continuously load the first and second operands from the first memory bank and send the loaded first and second operands to the execution engine;
    the execution engine is configured to implement the arithmetic function using the first and second operands and return resultant data of the arithmetic function to the transmit DMA engine; and
    the receive DMA engine is configured to receive the resultant data of the arithmetic function from the transmit DMA engine and store resultant data to a second memory bank in the shared data storage memory, the second memory bank being separate and distinct from the first memory bank.

4. The configurable accelerator of claim 1, wherein the at least one execution engine further includes a first and a second execution engine operatively coupled to a first transmit DMA engine, wherein, the second execution engine is configured to continuously receive the data from the first transmit DMA engine and further process the data to produce the resultant data; and the receive DMA engine is configured to store the resultant data processed by the second execution engine to the shared data storage memory.

5. The configurable accelerator of claim 4, wherein the data includes a first operand, a second operand, and a third operand of an arithmetic function implemented by the first and the second execution engines, the first operand, second operand, and third operand being located in a first memory bank of the shared data storage memory; and, wherein the first transmit DMA engine is configured to continuously load the first and second operands from the first memory bank and send the loaded first and second operands to the first execution engine;

the first execution engine is configured to process the first and second operands and provide resultant data of the processing to a first transmit DMA engine;

the first receive DMA engine is configured to receive the resultant data of the processing of the first, second, and the third operands from the first transmit DMA engine and send the resultant data to the second execution engine;

the second execution engine is configured to receive the resultant data of the processing of the first, second, and the third operands from the first receive DMA engine and process the resultant data to obtain a final result, and send the final result to the first receive DMA engine; and the first receive DMA engine is further configured to continuously store the final result to a second memory bank of the shared data storage memory, the second memory bank being separate and distinct from the first memory bank.

6. The configurable accelerator of claim 4, wherein the data includes a first operand, a second operand, and a third operand of an arithmetic function implemented by the first execution and the second execution engines, and the first operand and second operand are located in a first memory bank in the shared data storage memory, and the third operand is located in a second memory bank in the shared data storage memory, wherein the first transmit DMA engine is configured to continuously load the first and second operands from first bank, load the third operand from the second bank, and send the loaded first, second and third operands to the receive DMA engine; and the receive DMA engine is configured to continuously receive the first, second and the third operands from the first transmit DMA engine and store them to a third memory bank in the shared data storage memory in an interleaving fashion, wherein the first, second and third banks are mutually separate and distinct from each other.

7. The configurable accelerator of claim 1, wherein the transmit instruction or the execution instruction are generated by a processor operatively coupled to the register.

8. The configurable accelerator of claim 1, wherein the transmit instruction and the execution instruction are generated by one or more processors in a processor group operatively coupled to the register.

9. The configurable accelerator of claim 1, wherein the transmit and receive DMA engines are operatively coupled via a data connect located outside of the configurable accelerator.

10. The configurable accelerator of claim 1, wherein the transmit and receive DMA engines are operatively coupled via one or more DMA channels located inside the configurable accelerator.

11. The configurable accelerator of claim 1, wherein the at least one transmit DMA engine further includes a first and a second transmit DMA engine, the at least one execution engine further includes a first and a second execution engine and the at least one receive DMA engines further includes a first and a second receive DMA engine, and the first transmit DMA engine, the first execution engine, and the first receive DMA engine form a first processing group, wherein the configurable accelerator further comprises a second processing group including the second transmit engine, the second execution engine, and the second receive DMA engine, the second processing group being separate and distinct from the first processing group.

12. The configurable accelerator of claim 1, wherein the one or more functions implementable by the execution engine includes at least one of add, subtract, multiply, branch, jump, and shift.

13. The configurable accelerator of claim 1, wherein the one or more functions implementable by the execution engine includes a single operand function.

14. The configurable accelerator of claim 1, wherein the one or more functions implementable by the execution engine includes a multi-operand function.

15. A method for implementing one or more function using a configurable accelerator, the configurable accelerator comprising:

one or more transmit direct memory access (DMA) engines configured to continuously load data from a shared data storage memory based on a transmit instruction stored in a register operatively coupled to the configurable accelerator, the transmit instruction configured to cause the configurable accelerator to initiate an access request to access the shared data storage memory;

the one or more transmit DMA engines including a first transmit DMA engine;

one or more execution engines configurable to implement the one or more functions to process the data loaded by the first transmit DMA engine based on an execution instruction stored in the register, the execution engine configured to provide resultant data to the first transmit engine, the one or more execution engines includes a first execution engine operatively coupled to the first transmit DMA engine; and, one or more receive DMA engines configured to store resultant data to the shared data storage memory, the one or more receive DMA engines including a first receive DMA engine operatively coupled to the first transmit DMA engine;

the method comprising:

using the first execution engine to continuously process the data loaded by the first transmit DMA engine based on the execution instruction stored in the register and to provide the resultant data to the first transmit engine; and using the first receive DMA engine to receive the resultant data from the first transmit engine and to store the result data to the shared data storage memory.

16. The method of claim 15, wherein the shared data storage memory comprises multiple memory banks including a first memory bank and a second memory bank, the first memory bank being separate and distinct from the second memory bank, wherein
the data continuously loaded by the first transmit DMA engine is located in the first memory bank; and
the result data is stored by the first receive DMA engine to the second memory bank.

17. The method of claim 15, wherein the data includes a first operand and a second operand of an arithmetic function implemented by the first execution engine, the first operand and second operand being located in a first memory bank of the shared data storage memory, the first and second operands being loaded from first memory bank using the first transmit DMA engine, the method further comprising:
using the first transmit DMA engine to continuously send the first and second operands to the first execution engine;
using the first execution engine to implement the arithmetic function to provide a result of the arithmetic function to the first transmit DMA engine; and
using the first receive DMA engine store the result of the arithmetic function to a second memory bank of the shared data storage memory, wherein the second memory bank is separate and distinct from the first memory bank.

18. The method of claim 15, wherein the one or more execution engines further includes a second execution engine operatively connected to the first receive DMA engine, the method further comprising:
using the second execution engine to continuously receive the data from the first receive DMA engine and to further process the data to provide a result data; and
using the first receive DMA engine to store the result data processed by the second execution engine to the shared data storage memory.

19. The method of claim 17, wherein the data includes a first operand, a second operand, and a third operand of an arithmetic function implemented by the first execution and the second execution engines, and the first operand, second operand, and third operand are located in a first memory bank in the shared data storage memory the method further comprising:
using the first transmit DMA engine to continuously load the first and second operands from first memory bank and to send the loaded first and second operands to the first execution engine;
using the first execution engine to process the first and second operands and to provide a result data of the processing of the first and second operands to the first transmit DMA engine;
using the first receive DMA engine to receive the result data of the processing of the first, second, and third operands from the first transmit DMA engine and to provide the result of the processing of the first, second, and third operands to the second execution engine;
using the second execution engine to receive the result of the processing of the first, second, and third operands from the first receive DMA engine to process the result data of the processing of the first, second, and third operands to obtain final result data, and send the final result data to the first receive DMA engine; and
using the first receive DMA engine to store the final result data to a second memory bank of the shared data storage, the second bank being separate and distinct from the first bank.

20. The method of claim 17, wherein the data includes a first operand, a second operand, a third operand of an arithmetic function implemented by the first execution and the second execution engines, the first operand and second operand being located in a first memory bank in the shared data storage memory, and the third operand being located in a second memory bank in the shared data storage memory the method further comprising:
using the first transmit DMA engine to continuously load the first and second operands from the first memory bank, load the third operand from the second memory bank, and to send the loaded first, second, and third operands to the first receive DMA engine; and
using the first receive DMA engine to receive the first, second, and third operands from the first transmit DMA engine and to store them to a third memory bank in the shared data storage memory in an interleaving fashion, wherein the first, second and third memory banks are mutually separate and distinct from each other.

* * * * *